(12) United States Patent
Schell et al.

(10) Patent No.: US 7,328,904 B2
(45) Date of Patent: Feb. 12, 2008

(54) POWER TOOL WITH POWER-TAKE-OFF DRIVEN PUSHER-TYPE CHUCK HAVING DEVICE FOR REDUCING TENSION IN PUSHER SCREW

(75) Inventors: Craig A Schell, Street, MD (US); Daniel Puzio, Baltimore, MD (US); Robert S Gehret, Hampstead, MD (US); Richard J Heavel, Hanover, PA (US); Warren A Ceroll, Owings Mills, MD (US); Stephen A Debelius, New Freedom, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/390,668

(22) Filed: Mar. 28, 2006

(65) Prior Publication Data

US 2006/0232021 A1    Oct. 19, 2006

Related U.S. Application Data

(60) Provisional application No. 60/672,582, filed on Apr. 19, 2005.

(51) Int. Cl.
*B23B 31/16* (2006.01)
(52) U.S. Cl. .......................... 279/60; 279/902
(58) Field of Classification Search ............ 279/56, 279/60, 64, 65, 902; *B23B 31/16*
See application file for complete search history.

(56) References Cited

U.S. PATENT DOCUMENTS

| | | | | |
|---|---|---|---|---|
| 1,705,275 A | * | 3/1929 | Von Neudeck | 279/64 |
| 2,544,088 A | * | 3/1951 | Hollis | 279/60 |
| 4,456,270 A | * | 6/1984 | Zettl et al. | 279/62 |
| 4,527,809 A | * | 7/1985 | Umbert | 279/64 |
| 6,843,484 B2 | * | 1/2005 | Schroeder | 279/60 |
| 2004/0004329 A1 | * | 1/2004 | Schroeder | 279/60 |
| 2006/0237917 A1 | * | 10/2006 | Puzio et al. | 279/110 |

* cited by examiner

*Primary Examiner*—Monica Carter
*Assistant Examiner*—Eric A. Gates
(74) *Attorney, Agent, or Firm*—Harness, Dickey & Pierce, P.L.C.

(57) ABSTRACT

A chuck for a drill/driver. The chuck can include an input shaft having a cavity, a chuck actuating shaft and a chuck actuating screw. The chuck actuating shaft can be received in the cavity and can be rotatable about a chuck axis. The chuck actuating shaft can have a threaded aperture. The chuck actuating screw can have a threaded portion that is threadably engaged to the threaded aperture. The jaws can be received in the cavity and can engage the input shaft. The jaws can be coupled to the chuck actuating screw such that rotation of the chuck actuating shaft relative to the chuck actuating screw translates the jaws so that the jaws converge toward or diverge from the chuck axis. The chuck further includes a device coupled to at least one of the chuck actuating screw, the chuck actuating shaft and the input shaft for limiting elastic elongation of the chuck actuating screw in an axial direction when the jaws are positioned in a fully opened condition.

15 Claims, 11 Drawing Sheets

POWER TOOL WITH POWER-TAKE-OFF DRIVEN PUSHER-TYPE CHUCK HAVING DEVICE FOR REDUCING TENSION IN PUSHER SCREW

CROSS-REFERENCE TO RELATED APPLICATIONS

This application claims the benefit of U.S. Provisional Patent Application Ser. No. 60/672,582 filed Apr. 19, 2005 entitled PTO—Stop Mechanisms.

INTRODUCTION

The present invention generally relates to chucks and chuck arrangements for power tools and more particularly to a power tool having a power-take-off driven pusher-type chuck with a stop mechanism for reducing or eliminating tension in a pusher screw.

Power-take-off (PTO) driven chucks (i.e., chucks whose jaws can be driven open or closed via a PTO mechanism that can be selectively driven by an electrically or fluid driven (e.g., pneumatic) driven motor) are described in more detail in corresponding U.S. Provisional Patent Application Ser. No. 60/672,503 entitled "TOOL CHUCK WITH POWER TAKE OFF AND DEAD SPINDLE FEATURE", the disclosure of which is hereby incorporated by reference as if set forth herein in its entirety.

In the course of our work on PTO-driven chucks, we have found that the general configuration of pusher-type chucks lends itself to various improvements that have not heretofore been incorporated into other pusher-type chucks. One such line of improvement relates to a mechanism for limiting tension in the pusher screw. We have noted that when pusher-type chucks are motor driven, the pusher screw can bottom-out when the chuck is opened and can jam against the input shaft. When the pusher-type chuck bottoms out, the head of the pusher screw will remain stationary so that further rotation of the input shaft relative to the pusher screw will drive the shank of the pusher screw away from the head of the pusher screw and thereby elongate the pusher screw.

As will be appreciated from this disclosure, elongation of the pusher screw generates tension within the pusher screw that is applied to the chuck actuating shaft and which causes the pusher screw to bind or lock to the chuck actuating shaft. Moreover, due to differences between the dynamic and static coefficients of friction (the dynamic coefficient of friction is typically much smaller than the static coefficient of friction), it may be difficult in some situations to unlock the pusher screw from the chuck actuating shaft. Accordingly, there remains a need in the art for an improved pusher-type chuck.

SUMMARY

In one form, the present teachings provide a chuck for a drill/driver. The chuck can include an input shaft having a cavity, a chuck actuating shaft and a chuck actuating screw. The chuck actuating shaft can be received in the cavity and can be rotatable about a chuck axis. The chuck actuating shaft can have a threaded aperture. The chuck actuating screw can have a threaded portion that is threadably engaged to the threaded aperture. The jaws can be received in the cavity and can engage the input shaft. The jaws can be coupled to the chuck actuating screw such that rotation of the chuck actuating shaft relative to the chuck actuating screw translates the jaws so that the jaws converge toward or diverge from the chuck axis. The chuck further includes means coupled to at least one of the chuck actuating screw, the chuck actuating shaft and the input shaft for limiting elastic elongation of the chuck actuating screw in an axial direction when the jaws are positioned in a fully opened condition.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
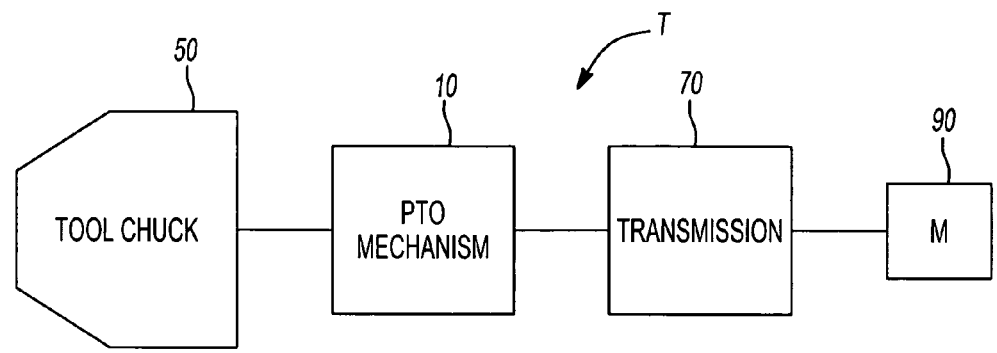
FIG. 1 is a schematic illustration of a power tool having a PTO-driven chuck constructed in accordance with the teachings of the present disclosure.

With reference to FIG. 1, an exemplary power tool T, such as a drill/driver or hammer drill/driver, is schematically illustrated. The power tool T can include a PTO-driven tool chuck 50 that is constructed in accordance with the teachings of the present disclosure. It will be appreciated, however, that the tool chuck 50 may be suitably implemented on a variety of power drivers (other than drills and hammer drills) for holding a variety of tools (other than drill bits).

The tool chuck 50 may be connected to the transmission 70 of a power driver via a power take off ("PTO") mechanism 10. The transmission 70 may be coupled to an electric motor 90. The transmission 70 may use gearing to effect a change in the ratio between an input rpm (from the electric motor 90) and an output rpm (delivered to the tool chuck 50).

In this example embodiment, the transmission 70 may include three planetary reduction systems. It will be appreciated, however, that the invention is not limited in this regard. For example, more or less than three planetary reduction systems may be implemented. Further, transmissions other than planetary reduction system transmissions (e.g., conventional parallel axis transmissions) may be suitably implemented. Planetary reduction transmissions are well known in this art, and therefore a detailed discussion of the same is omitted. The PTO mechanism 10 may be provided at the output of the transmission 70.

Figure 2:
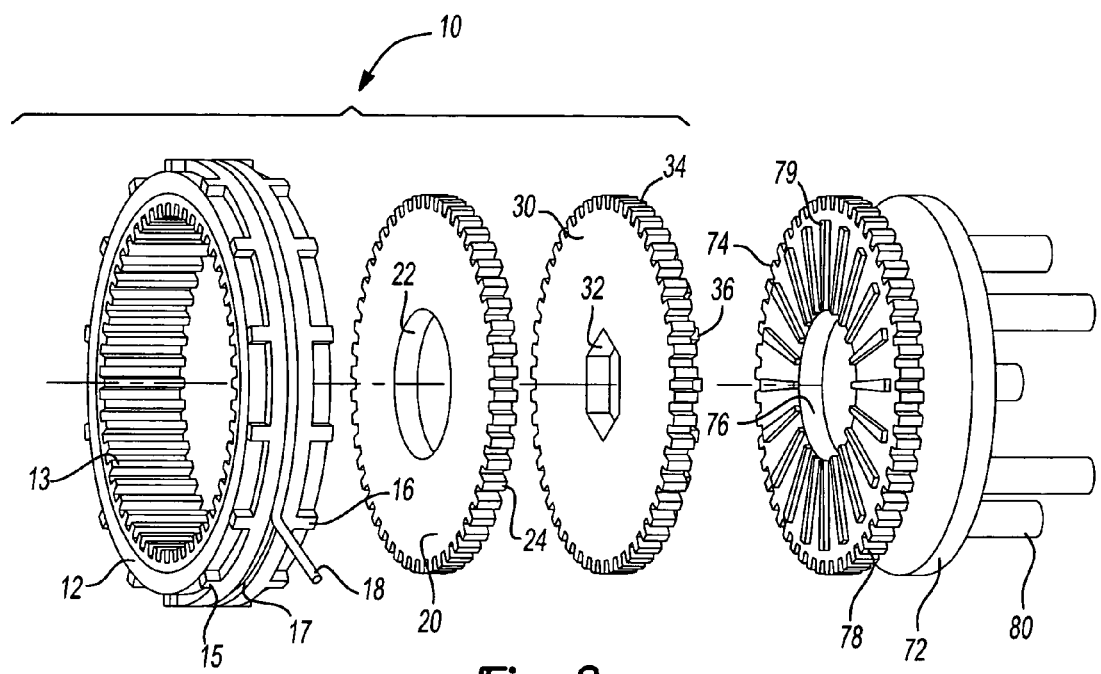
FIG. 2 is an exploded perspective view of a portion of the power tool of FIG. 1, illustrating the PTO mechanism in greater detail.

FIG. 2 is an exploded perspective view of the PTO mechanism 10. In this example embodiment, the PTO mechanism 10 may include a shift ring 12, an output coupling 20 and a PTO drive disk 30.

The shift ring 12 may have a radial inward facing surface provided with splines 13 (for selectively engaging with the output coupling 20, the PTO drive disk 30 and a disk 74 of the third stage carrier 72). The shift ring 12 may have a radial outward facing surface provided with forwardly extended splines 15 and rearwardly extended splines 16 (for selective engaging with a housing of the driver, not shown) and a continuous circumferential groove 17 (for accommodating a wire 18).

The wire 18, which may be slidable through the circumferential groove 17, may have free ends that extend in a radial direction and out of the circumferential groove 17. The fee ends of the wire 18 (serving as cam followers) may be received in a slot of a shift collar rotatably mounted on the driver housing. Upon rotating the shift collar, the slot may influence the cam followers (and thus the shift ring 12) to the desired axial positions, as will be discussed in more detail below.

The output coupling 20 may include a central aperture 22 having a shape that corresponds to the shape of an input shaft 60, discussed in more detail below. The output coupling 20 may have a radial outward facing surface provided with splines 24 that selectively cooperate with the radial inward facing splines 13 of the shift ring 12.

The PTO drive disk 30 may include a central aperture 32 having a shape that corresponds to the shape of a PTO actuator shaft, discussed in more detail below. The PTO drive disk 30 may have a radial outward facing surface provided with splines 34 that selectively cooperate with the radial inward facing splines 13 of the shift ring 12. The PTO drive disk 30 may have an axial rearward facing surface provided with clutch features 36. In this example embodiment, the clutch features 36 may be in the form of elongated projections that extend in a radial fashion across the axial rearward facing surface of the PTO drive disk 30.

The disk 74 of the third stage carrier 72 may include a central aperture 76 that extends axially through the third stage carrier 72. The disk 74 may have a radial outward facing surface provided with splines 78 that selectively cooperate with the radial inward facing splines 13 of the shift ring 12. The disk 74 may also include an axial forward facing surface provided with clutch features 79. In this example embodiment, the clutch features 79 may be in the form of elongated projections that extend in a radial fashion across the axial forward facing surface of the disk 74. The clutch features 79 of the disk 74 may cooperate with the clutch features 36 of the PTO drive disk 30. As is well known in this art, the third stage carrier 72 may include shafts 80 that rotatably support planetary gears (not shown).

Figure 3:
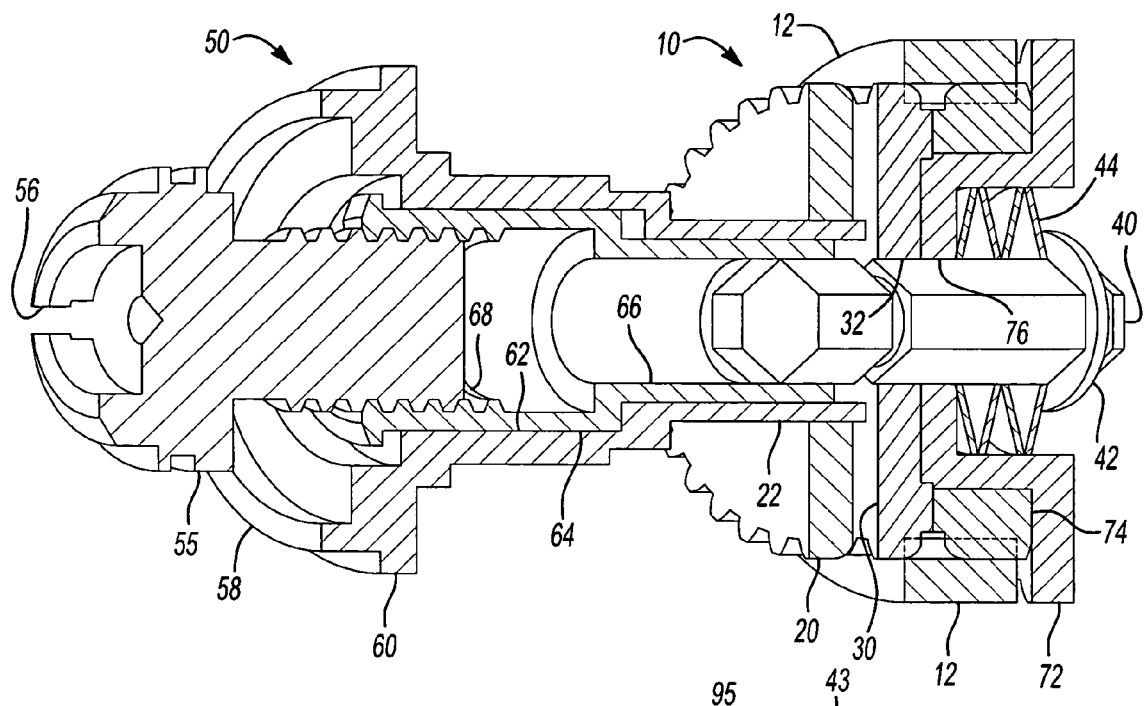
FIG. 3 is a sectional perspective view of a portion of the tool of FIG. 1 illustrating the chuck as mounted on the PTO mechanism.

FIG. 3 is a sectional perspective view of the PTO mechanism 10 assembled together with the tool chuck 50. Here, the shift ring 12 is shown in phantom for clarity.

The tool chuck 50 may include an input shaft 60. A forward end of the input shaft 60 may include a housing H (FIG. 4) that defines a cavity C (FIG. 4) having passageways through which chuck jaws J (FIG. 4) are respectively slidable. The passageways of the nose portion may rotationally fix the input shaft 60 to the chuck jaws. The input shaft 60 may have a rear end that extends through the central aperture 22 of the output coupling 20. The rear end of the input shaft 60 may have a radial outward facing surface provided with features that cooperate with corresponding features provided on the radial inward facing surface defining the central aperture 22 so that the input shaft 60 may be rotationally locked to the output coupling 20. Such features are well known in this art. By way of example only, the input shaft 60 may be provided with flats against which flats of the central aperture 22 may abut to rotationally lock together the input shaft 60 and the output coupling 20. The input shaft 60 may include a through bore 62. The through bore 62 may rotatably support a chuck actuating shaft 64.

The chuck actuating shaft 64 may include a through bore 66. The through bore 66 may have a rear end receiving a PTO actuator shaft 40. The rear end of the through bore 66 and the PTO actuator shaft 40 may have corresponding shapes to rotationally fix the chuck actuating shaft 64 to the PTO actuator shaft 40. The forward end of the through bore 66 may be provided with radial inward facing threads 68 that may interact with radial outward facing threads 58 of a chuck actuating screw 55. That is, the chuck actuating shaft 64 may be screw coupled to the chuck actuating screw 55.

The chuck actuating screw 55 may include radial passageways 56 through which the chuck jaws are respectively slidable. The radial passageways 56 may rotationally fix the chuck actuating screw 55 to the chuck jaws. The interaction between the threads 58 and 68 may cause the chuck actuating screw 55 to advance and retract in the axial direction relative to the input shaft 60. It will be appreciated that the chuck actuating screw 55 and input shaft 60 may be rotationally locked together via the chuck jaws.

The PTO actuator shaft 40 extends through the through bore 66 of the chuck actuating shaft 64, the central aperture 33 of the PTO drive disk 30 and the central aperture 76 of the disk 74. A keeper 42 (in the form of a snap ring, for example) may be mounted on the PTO actuator shaft 40. A spring 44 may be mounted on the PTO actuator shaft 40 and compressed between the third stage carrier 72 and the keeper 42. The PTO actuator shaft 40 may support another keeper (not shown for clarity) via a slot located axially forward of the PTO drive disk 30. As noted above, the PTO actuator shaft 40 may have a shape that corresponds to the shape of the central aperture 32 of the PTO drive disk 30. In this way, the PTO actuator shaft 40 may be rotationally fixed to the PTO drive disk 30.

As shown in FIG. 3, the output coupling 20, the PTO drive disk 30 and the disk 74 of the third stage carrier 72 may be assembled together in a coaxial fashion. Here, the clutch features 36 of the PTO drive disk 30 may face (and engage with) the clutch features 79 of the disk 74. Also, the shift ring 12 (shown in phantom) may be mounted for axial movement so that the radial inward facing splines 13 of the shift ring 12 may selectively engage with the radial outward facing splines 24 of the output coupling 20, the radial outward facing splines 34 of the PTO drive disk 30 and the radial outward facing splines 78 of the disk 74.

The tool chuck 50 may operate differently depending on the axial position of shift ring 12, which may assume three different operating positions inclusive of a MANUAL OVERRID MODE, a DRILL/DRIVE MODE and a CHUCK MODE.

FIG. 3 illustrates the shift ring 12 in the MANUAL OVERRIDE MODE, in which the shift ring 12 may be located at an axial rearward position. Here, the radial outward facing splines 16 of the shift ring 12 may engage with corresponding features provided on the driver housing (not shown). Thus, the shift ring 12 may be rotationally fixed (or grounded) to the driver housing. The radial inward facing splines 13 of the shift ring 12 may engage with the radial outward facing splines 34 of the PTO drive disk 30 and the radial outward facing splines 78 of the disk 74. Thus, the shift ring 12, the PTO drive disk 30 (and therefore the PTO actuator shaft 40) and the disk 74 (and therefore the third stage carrier 72) may be rotationally grounded to the driver housing. In this condition, the output coupling 20 and the input shaft 60 may remain rotatable relative to the driver housing.

A user may grasp and manually rotate the input shaft 60 (together with the chuck jaws and the chuck actuating screw 55) relative to the driver housing. The chuck actuating screw 55 may rotate relative to the chuck actuating shaft 64, which may be rotationally fixed to the PTO actuator shaft 40 (and therefore may be rotationally grounded to the driver housing). This relative rotation may cause the chuck actuating screw 55 to advance or retract in the axial direction (depending on the rotation direction of the input shaft 60) by virtue of the interaction between the radially inward facing threads 68 and the radially outward facing threads 58. The translational movement of the chuck actuating screw 55 may push or pull on the chuck jaws to open or close the same.

For example, during a closing operation, the chuck actuating screw 55 (together with the chuck jaws) may be advanced in the axial direction. During this time, the passageways of the nose portion of the input shaft 60 may influence the chuck jaws 2 in a radial inward direction through the radial passageways 56 of the chuck actuating screw 55. This pusher type jaw action is well known in the pertinent art.

The DRILL/DRIVE MODE may be achieved by sliding the shift ring 12 forward to an intermediate axial position. Here, the shift ring 12 may be disengaged from (and rotatable relative to) the driver housing. The radial inward facing splines 13 of the shift ring 12 may engage with the radial outward facing splines 24 of the output coupling 20, the radial outward facing splines 34 of the PTO drive disk 30 and the radial outward facing splines 78 of the disk 74. Thus, the shift ring 12, the output coupling 20 (and therefore the input shaft 60), the PTO drive disk 30 and the disk 74 (and therefore the third stage carrier 72) may be rotationally fixed together and rotatable as a unit. Since the PTO drive disk 30 (and therefore the PTO actuator shaft 40 and the chuck actuating shaft 64) and the output coupling 20 (and therefore the input shaft 60 and the chuck actuating screw 55) may be rotationally locked together, the tool chuck 50 may not loosen during operation. A user may then power up the driver to rotationally drive the tool chuck 50.

The CHUCK MODE may be achieved by sliding the shift ring 12 to a forward axial position. Here, the radial outward facing splines 15 of the shift ring 12 may engage with corresponding features provided on the driver housing. Thus, the shift ring 12 may be rotationally grounded to the driver housing. The radial inward facing splines 13 of the shift ring 12 may engage with the radial outward facing splines 24 of the output coupling 20. Thus, the shift ring 12 and the output coupling 20 (and therefore the input shaft 60 and the chuck actuating screw 55) may be rotationally grounded to the driver housing. Here, the PTO drive disk 30 (and therefore the PTO actuator shaft 40 and the chuck actuating shaft 64) and the disk 74 (and therefore the third stage carrier 72) may remain rotatable relative to the driver housing.

A user may then power up the driver to actuate the tool chuck 50. At this time, the third stage carrier 72 may rotationally drive the PTO drive disk 30 via the cooperating clutch features 79 and 36 respectively provided on the confronting surfaces of the disk 74 and the PTO drive disk 30. The PTO drive disk 30 may rotationally drive the PTO actuator shaft 40, which in turn may rotationally drive the chuck actuating shaft 64. The chuck actuating shaft 64 may rotate relative to the chuck actuating screw 55, which may remain rotationally grounded to the driver housing (via the chuck jaws, the input shaft 60, the output coupling 20 and the shift ring 12). This relative rotation may cause the chuck actuating screw 55 to advance or retract in the axial direction (depending on the rotation direction of the chuck actuating shaft 64) by virtue of the interaction between the radial inward facing threads 68 and the radial outward facing threads 58. The translational movement of the chuck actuating screw 55 may push or pull on the chuck jaws to open or close the same.

During chuck actuation, the input shaft 60, the chuck jaws and the chuck actuating screw 55 may remain rotationally grounded to the driver housing, while the chuck actuating screw 55 may move axially (via the rotational movements of the chuck actuating shaft 64) relative to the input shaft 60 to open and close the chuck jaws. This may be referred to as a dead spindle feature since the user may not be exposed to (or observe) any rotating parts.

Once the tool chuck 50 is tight (i.e., when the chuck jaws clamp the accessory) or fully opened, the cooperating clutch features 79 and 36 respectively provided on the confronting surfaces of the disk 74 and the PTO drive disk 30 may give way and slip relative to each other. At this time, the disk 74 (together with the third stage carrier 72) may move in an axial rearward direction against the influence of the spring 44. When the cooperating clutch features 79 and 36 slip, they may produce an audible indication that the chuck actuation process is complete.

The cooperating clutch features 79 and 36 may give way or slip at a predetermined torque threshold. The predetermined torque threshold may be suitably adjusted by selecting an appropriate spring 44 and/or by suitably designing the geometries of the cooperating clutch features 79 and 36. Further, the predetermined torque threshold for tightening the tool chuck 50 may be less than the predetermined torque threshold for loosening the tool chuck 50. This feature may be obtained by suitably designing the geometries of the cooperating clutch features 79 and 36. Numerous and varied clutch surface geometries are well known in this art, and therefore a detailed discussion of the same is omitted.

Figure 4:
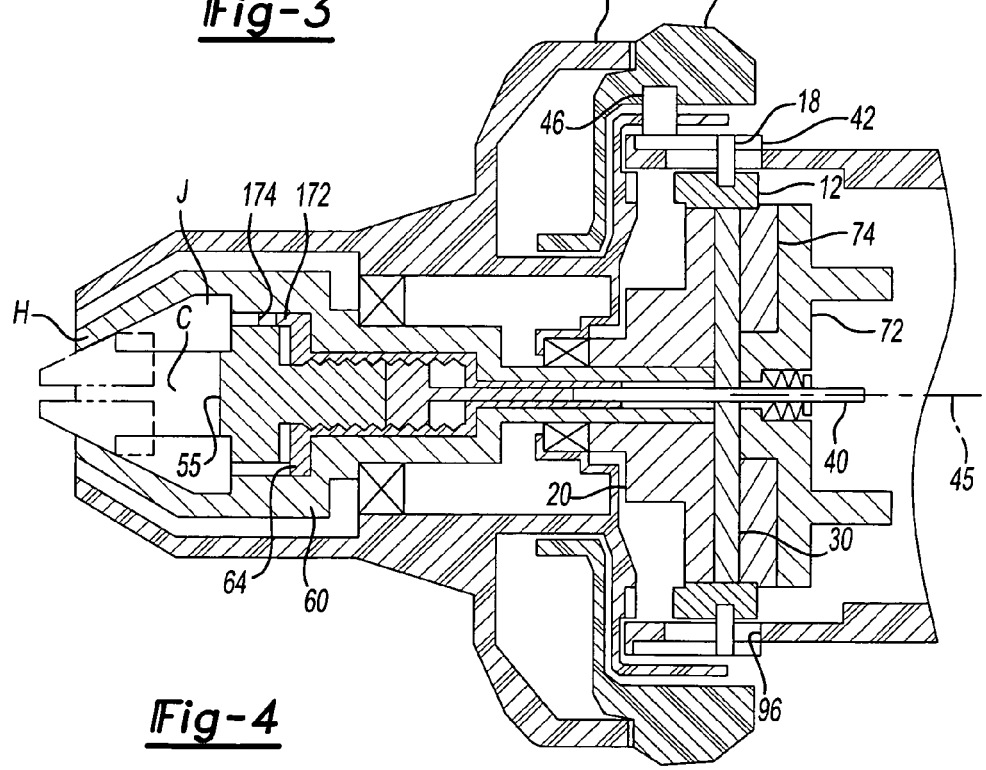
FIG. 4 is a sectional view of a portion of the tool of FIG. 1 illustrating a mode ring and a shift collar for changing an operational mode of the tool.

FIG. 4 shows an example, non-limiting embodiment of a mode ring 43 and a shift collar 42 that may be implemented to axially position the shift ring 12 depicted in FIGS. 2 and 3 to achieve the various operational modes. In FIG. 4, the portion of the drawing above the axis 45 depicts the DRILL/DRIVE MODE (where the shift ring 12 may be located at the intermediate axial position), and the portion of the drawing below the axis 45 depicts the CHUCK MODE (where the shift ring 12 may be located at the forward axial position).

The mode ring 43 and the shift collar 42 may be mounted for rotation on the driver housing 95. The mode ring 43 and the shift collar 42 may be rotationally fixed together via a radial extension 46. Thus, the mode ring 43 and the shift collar 42 may be rotatable together relative to the driver housing 95.

The shift collar 42 may include a slot that extends in a circumferential direction around the shift collar 42. In this example embodiment, the shift collar 42 may include two circumferential slots. The driver housing 95 may include longitudinal slots 96. The longitudinal slots 96 may extend across (and underneath) the circumferential slots of the shift collar 42. The ends of the wire 18 may extend in a radial outward direction from the shift ring 12, through the longitudinal slots 96 of the driver housing 95 and into the slots of the shift collar 42.

A user may rotate the mode ring 43 (and thus the shift collar 42) relative to the housing 95. At this time, the wire 18 may remain rotationally fixed to the housing 95 via the longitudinal slots 96. During this relative rotation, the ends of the wire 18 may slide through the circumferential slots of the shift collar 42. The shapes of the circumferential slots of the shift collar 42 may influence the wire 18 (and thus the shift ring 12) to the desired axial position. In this regard, the ends of the wire 18 may serve as cam followers and the corresponding circumferential slots may serve as cams. It will be appreciated that the circumferential slots of the shift collar 42 may extend in axial directions to thereby axially displace the shift ring 12.

Figure 5:
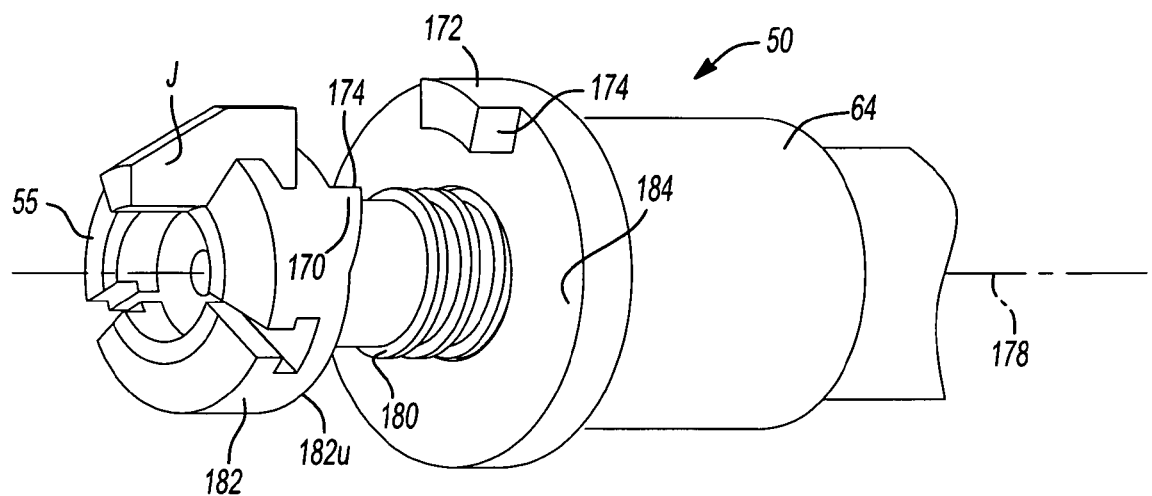
FIG. 5 is a perspective view of a portion of the chuck illustrating the set of thread stop dogs in more detail.

With reference to FIG. 5 of the drawings, the chuck actuating screw 55 and the chuck actuating shaft 64 can include a thread stop dog 170 and 172, respectively, that are configured to confront one another when the chuck actuating shaft 64 is rotated to a point where the chuck jaws J are opened to a maximum opening. The thread stop dogs 170 and 172 each include a confronting surface 174 that can be disposed in a plane that be positioned at an angle relative to the rotational axis 178 of the chuck actuating shaft 64 and can be located radially outwardly of the threads 180 that are formed on the chuck actuating screw 55. In the example provided, the plane that includes the confronting surfaces 174 can include the rotational axis 178 (when the confronting surfaces 174 abut one another), but it will be appreciated that the plane could be positioned at any desired angle and need not intersect the rotational axis 178.

In operation, the chuck actuating shaft 64 will be rotated to cause the head 182 of the chuck actuating screw 55 to translate toward the forward end 184 of the chuck actuating shaft 64 until the confronting surfaces 174 of the thread stop dogs 170 and 172 confront one another. Abutment of the confronting surfaces 174 to one another can define a fully open condition of the jaws J and can inhibit further rotation of the chuck actuating shaft 64 relative to the chuck actuating screw 55 so that tensioning of the chuck actuating screw 55 can be reduced or eliminated. More specifically, tension in the chuck actuating screw 55 is a function of its elastic elongation and prohibiting rotation of the chuck actuating sleeve 64 relative to the chuck actuating screw 55 prevents further elongation of the chuck actuating screw 55 to thus limit the tensioning of the chuck actuating screw 55. Moreover, as the underside 182u of the head 182 of the chuck actuating screw 55 does not contact the forward end 184 of the chuck actuating shaft 64, the significance of a difference between the static and dynamic coefficients of friction is relatively less important as compared to a prior art pusher-type chuck.

Figure 6:
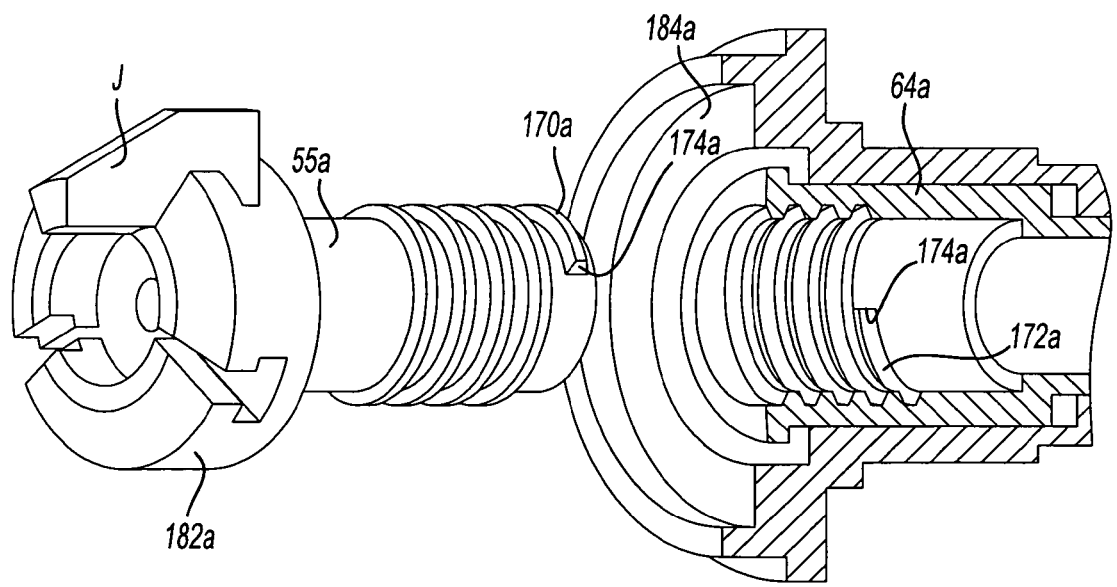
FIG. 6 is a sectional perspective view illustrating a first set of alternately constructed thread stop dogs.

While the stop mechanism has been illustrated and described as including a feature that is formed on the head of the chuck actuating screw, those of ordinary skill in the art will appreciate that the invention, in its broadest aspects, may be constructed somewhat differently. For example, the thread stop dogs 170a and 172a can be formed on the threads of the chuck actuating screw 55a and the chuck actuating shaft 64a, respectively, as shown in FIG. 6. In this example, the male and female threads may be formed via a process such as metal injection molding (MIM). The thread stop dog 170a can be positioned toward the end of the chuck actuating screw 55a and the thread stop dog 172a can be positioned on the chuck actuating shaft 64a rearwardly of (or at the end of) the female threads that threadably engage the male threads of the chuck actuating screw 55a. The thread stop dogs 170a and 172a can be configured to have contact surfaces 174a that confront one another before the head 182a contacts the forward end 184a of the chuck actuating shaft 64a.

Figure 7:
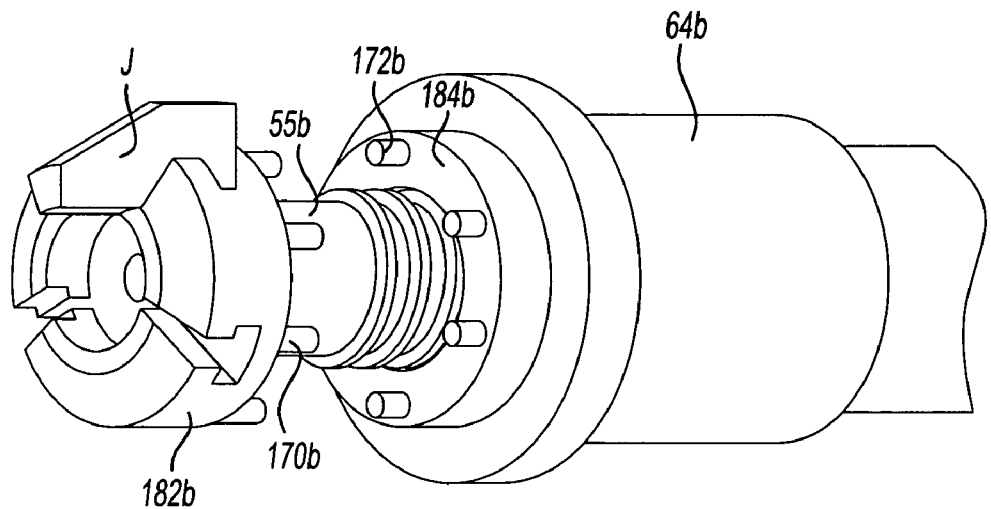
FIG. 7 is a perspective view similar to that of FIG. 5 but illustrating another alternately constructed set of thread stop dogs.

Another alternative is illustrated in FIG. 7, wherein the thread stop dogs 179b can protrude from the underside of the head 182 of the chuck actuating screw 55b and/or the thread stop dogs 172b can protrude from the forward end 184b of the chuck actuating shaft 64b. In the example provided, the thread stop dogs 170b and 172b comprise cylindrical pin protrusions, but those of ordinary skill in the art will appreciate that other shapes and configurations may be employed.

Figure 8A:
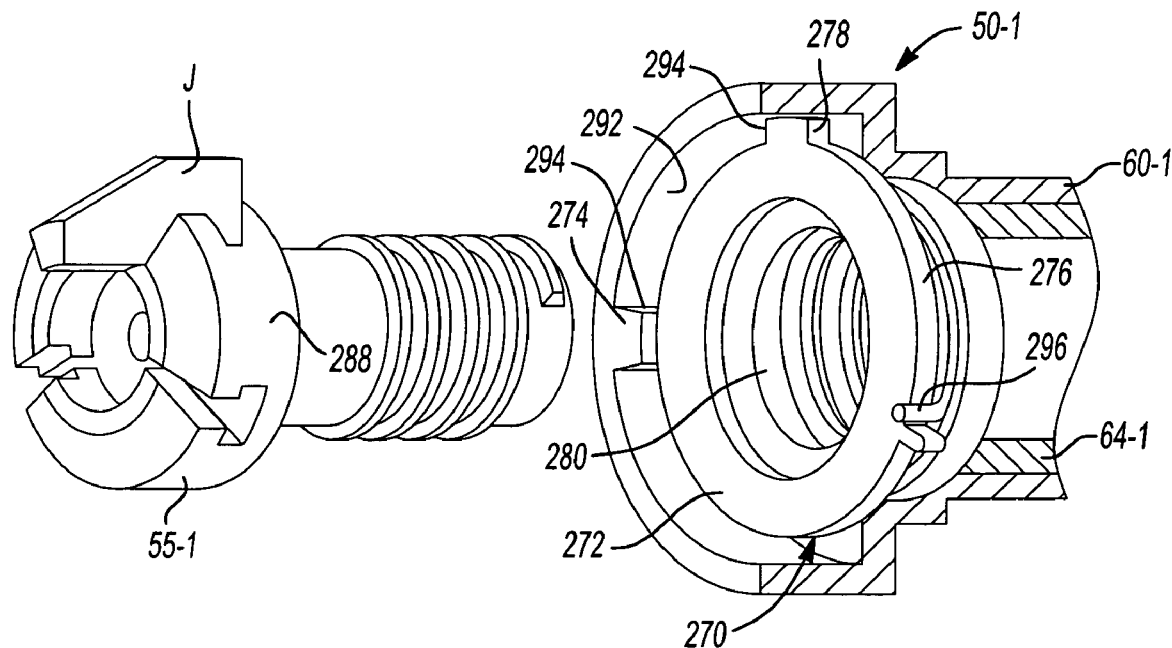
FIG. 8A is a sectional perspective view of a portion of a second chuck constructed in accordance with the teachings of the present disclosure.
Figure 8B:
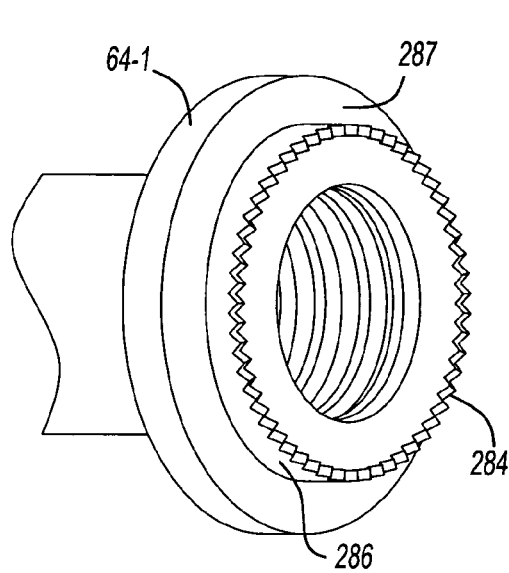
FIG. 8B is a perspective view of a portion of the chuck of FIG. 8A illustrating the first stop member in greater detail.
Figure 8C:
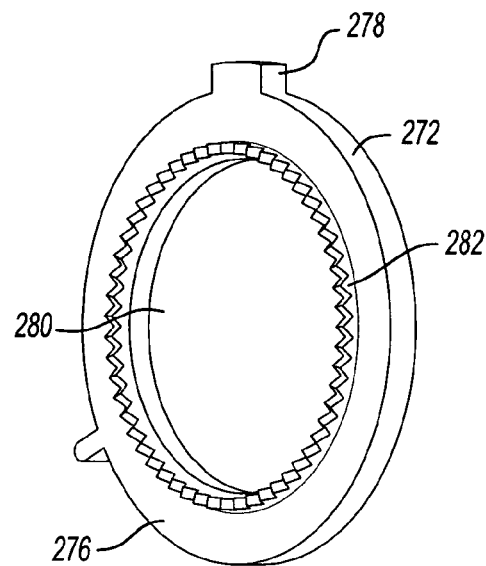
FIG. 8C is a perspective view of a portion of the chuck of FIG. 8A illustrating the chuck actuating shaft in greater detail.

With reference to FIGS. 8A-8C of the drawings, a portion of another PTO-driven chuck 50-1 constructed in accordance with the teachings of the present disclosure is illustrated. The PTO-driven chuck 50-1 is generally similar to the tool chuck 50 described above and illustrated in FIGS. 1 through 5, except for the use of a stop mechanism 270 between the chuck actuating screw 55-1 and the chuck actuating shaft 64-1.

The stop mechanism 270 can include a first stop member 272 and a second stop member 274. The first stop member 272 can have an annular body 276 and a thread stop dog 278 that extends radially outwardly from the annular body 276. The annular body 276 can have an aperture 280 formed therethrough for receiving the male-threaded body of the chuck actuating screw 55-1 and a plurality of engaging features 282, such as teeth or castilations that are formed about the perimeter of the aperture 280 on a side of the annular body 276 that faces the chuck actuating shaft 64-1. The engaging features 282 are configured to engage mating engaging features 284 that are formed on a flange face 286 of the chuck actuating shaft 64-1.

The second stop member or thread stop dog 274 can be formed on radially inner face 292 of the input shaft 60-1. The thread stop dog 278 and the second stop member 274 can be configured with confronting surfaces 294 that will be discussed in greater detail below. A combination compression and torsion spring 296 can fitted into a shoulder 287 that is formed about the flange face 286 and can be employed to bias the confronting surface 294 of the thread stop dog 278 in a circumferentially spaced-apart condition relative to the confronting surface 294 of the second stop member 274 as well as to bias the first stop member 272 axially apart from the flange face 286. Consequently, the engaging features 282 are biased into a condition that is disengaged from the mating engaging features 284.

In operation, the chuck actuating shaft 64-1 can be rotated to cause the head 288 of the chuck actuating screw 55-1 to be translated toward the chuck actuating shaft 64-1. Contact between the head 288 and the first stop member 272 can urge the first stop member 272 rearwardly such that the engaging features 282 meshingly engage the mating engaging features 284. When the engaging features 282 matingly (axially) engage the mating engaging features 284, further rotation of the chuck actuating shaft 64-1 in a direction that tends to open the jaws J of the chuck 50-1 will cause the first stop member 272 to co-rotate with the chuck actuating shaft 64-1 so that the confronting surface 294 on the thread stop dog 278 is driven into abutment with the confronting surface 294 on the second stop member 274.

Engagement of the confronting surfaces 294 to one another can inhibit further rotation of the chuck actuating shaft 64-1 relative to the chuck actuating screw 55-1. When the chuck actuating shaft 64-1 is rotated in a direction that tends to close the jaws J of the chuck 50-1, the first stop member 272 will rotate (either through motion of the chuck actuating shaft 64-1 transmitted through the engaging and mating engaging features 282 and 284 or through the rotational force exerted by the combination compression and torsion spring 296) so that the first stop member 272 will travel in a rotational direction away from the second stop member 274.

Figure 9A:
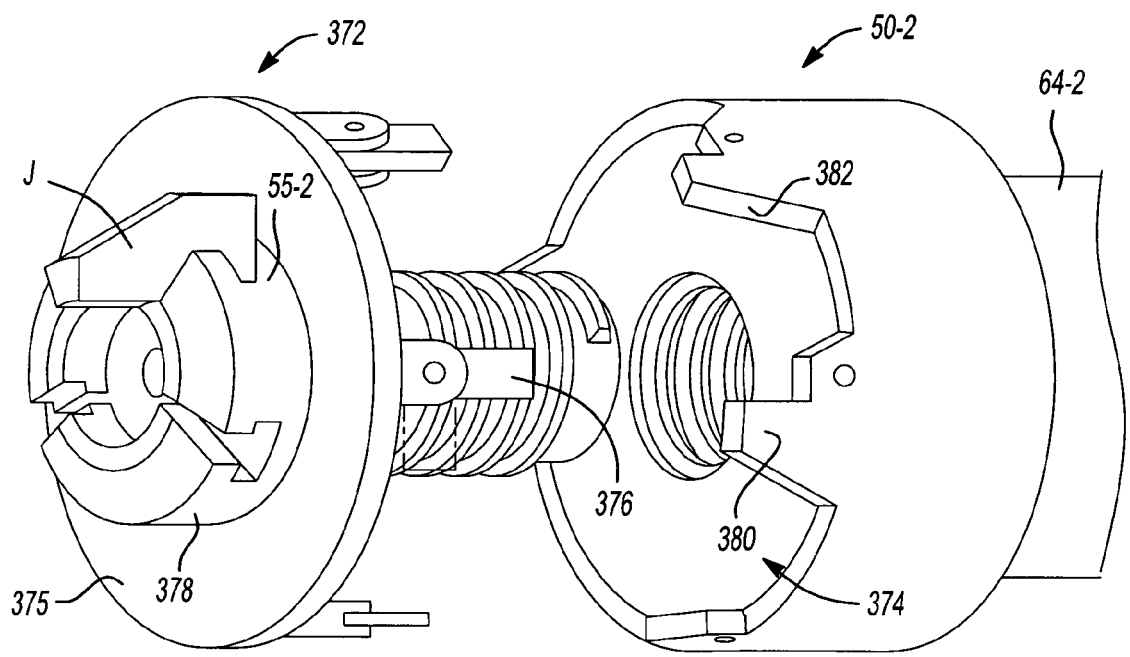
FIG. 9A is a perspective view of a portion of a third chuck constructed in accordance with the teachings of the present disclosure.
Figure 9B:
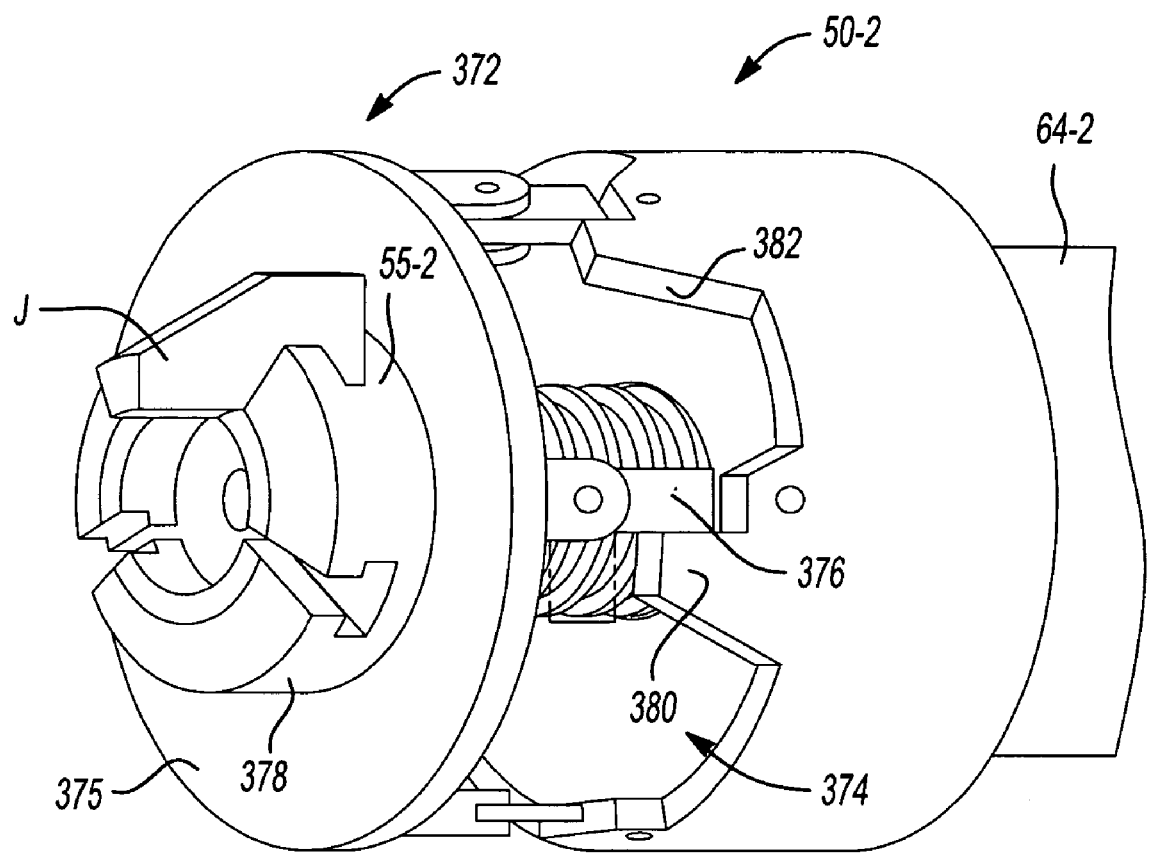
FIG. 9B is similar to FIG. 9A but illustrates the thread stop dogs in abutment with one another to thereby inhibit rotation of the chuck actuating shaft relative to the chuck actuating sleeve.

With reference to FIGS. 9A and 9B of the drawings, a portion of an exemplary PTO-driven chuck 50-2 constructed in accordance with the teachings of the present invention is illustrated. The PTO-driven chuck 50-2 is generally similar to the tool chuck 50 described above and illustrated in FIGS. 1 through 5, except for the use of a stop mechanism 370 between the chuck actuating screw 55-2 and the chuck actuating shaft 64-2.

The stop mechanism 370 can include a first stop 372 and a second stop 374. The first stop 372 can include an annular structure 375 that is non-rotatably coupled to the chuck actuating screw 55-2 and which includes one or more thread stop dogs 376. The thread stop dogs 376 can be pivotally attached to the annular structure 375 (or in the alternative, to the head 378 of the chuck actuating screw 55-2) and can be pivotally movable between an extended position, which is illustrated in solid line, and a retracted position, which is illustrated in phantom line. The thread stop dogs 376 can be biased via a spring (not shown) into the extended position. The second stop or thread stop dog 374 can include one or more stop teeth 380 and optionally one or more ramps 382.

Rotation of the chuck actuating shaft 64-1 in a direction that opens the chuck jaws J will cause the thread stop dogs 376 to abut the stop teeth 380 of the second stop 374 at a point before the head 378 of the chuck actuating screw 55-2 contacts the forward face 384 of the chuck actuating shaft 64-2. Contact between the thread stop dogs 376 and the stop teeth 380 resist or inhibit further rotation of the chuck actuating screw 64-2 relative to the chuck actuating screw 55-2 in the direction that tends to open the chuck jaws J. If included, the ramps 382 can be configured to urge the thread stop dogs 376 toward the retracted position when the chuck actuating shaft 64-2 is rotated in a direction that tends to close the chuck jaws.

Figure 10:
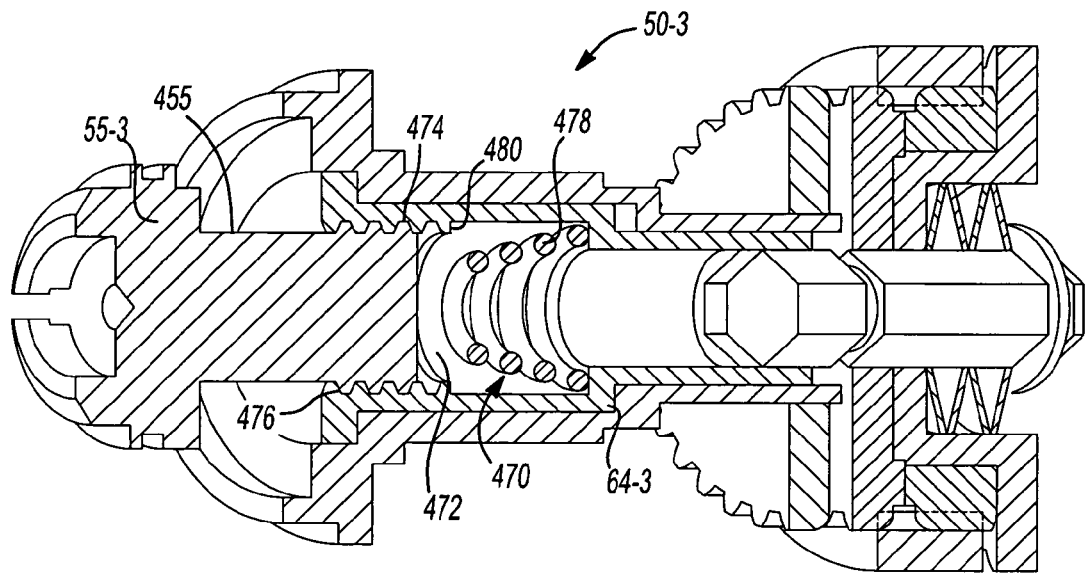
FIG. 10 is a sectional perspective view of a portion of a fourth chuck constructed in accordance with the teachings of the present disclosure.

With reference to FIG. 10 of the drawings, a portion of an exemplary PTO-driven chuck 50-3 constructed in accordance with the teachings of the present disclosure is illustrated. The PTO-driven chuck 50-3 is generally similar to the tool chuck 50 described above and illustrated in FIGS. 1 through 5, except for the use of an anti-over tightening mechanism 470 in conjunction with the chuck actuating screw 55-3 and the chuck actuating shaft 64-3 rather than thread stop dogs.

The anti-over tightening mechanism 470 can include a cavity 472, which can be formed into the chuck actuating shaft 64-3 rearwardly of a female threaded potion 474 that threadably engages a corresponding male threaded portion 476 of the chuck actuating screw 55-3, and a resilient element or spring 478 that can be employed to contact the end of the male threaded portion 476 of the chuck actuating screw 55-3 as the chuck actuating screw 55-3 is threaded into the bottom of the chuck actuating shaft 64-3. While the spring 478 has been illustrated as being a compression spring, those of ordinary skill in the art will appreciate that the spring could be any appropriate type of spring, including a Belleville washer or a wave spring.

When the chuck actuating shaft 64-3 is rotated to the point where the chuck jaws are opened to a maximum opening, the male threaded portion 476 of the chuck actuating screw 55-3 can disengage the female threaded portion 474 of the chuck actuating shaft 64-3 to thereby ensure that tension is not generated within the chuck actuating screw 55-3. The spring 478 biases the male threaded portion 476 of the chuck actuating screw 55-3 against the female threaded portion 474 of the chuck actuating shaft 64-3 so that the male threaded portion 476 will threadably engage the female threaded portion 474 when the chuck actuating screw 55-3 is rotated in a direction that tends to close the chuck jaws.

Figure 11:
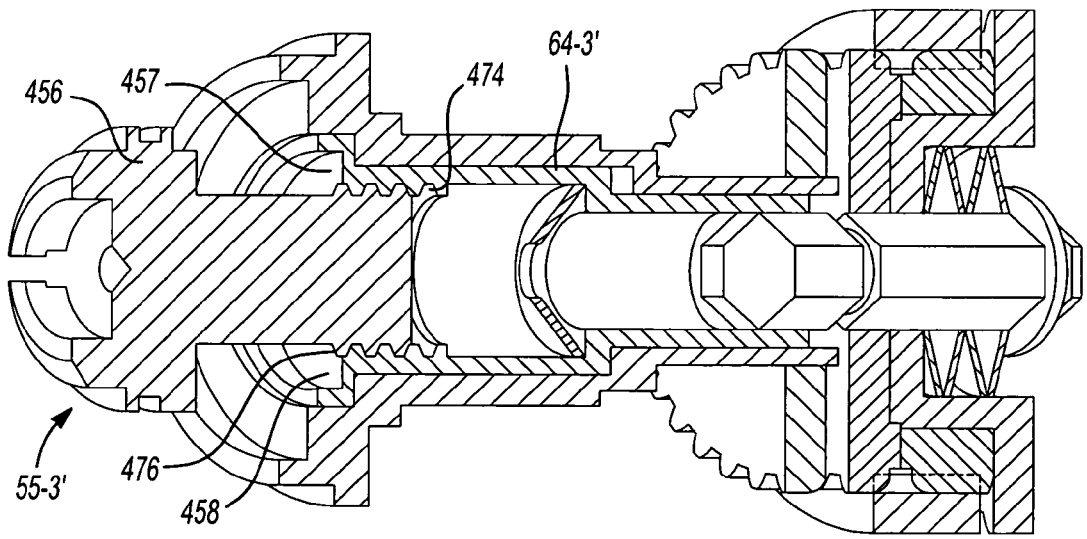
FIGS. 11 and 12 are sectional views similar to that of FIG. 10 but illustrating an alternate spring and/or piloting configuration.

As those of ordinary skill in the art will appreciate, the chuck actuating screw 55-3 can have an unthreaded neck portion 455 that can be sized to closely correspond to the minor or root diameter of the female threaded portion 474. Configuration in this manner permits the female threaded portion 474 to pilot the unthreaded neck portion 455 and thereby ensure that the male threaded portion 476 will not cross-thread when re-engaged to the female threaded portion 474. Alternatively, the head 456 of the chuck actuating screw 55-3' may be configured as shown in FIG. 11. In this example, the head 456 is configured to engage a corresponding counterbore or aperture 457 that is formed in a front face 458 of the chuck actuating shaft 64-3'. The aperture 457 and the head 456 cooperate to align the chuck actuating screw 55-3' to the chuck actuating shaft 64-3' and thereby ensure that the male threaded portion 476 will not cross-thread when re-engaged to the female threaded portion 474.

Figure 12:
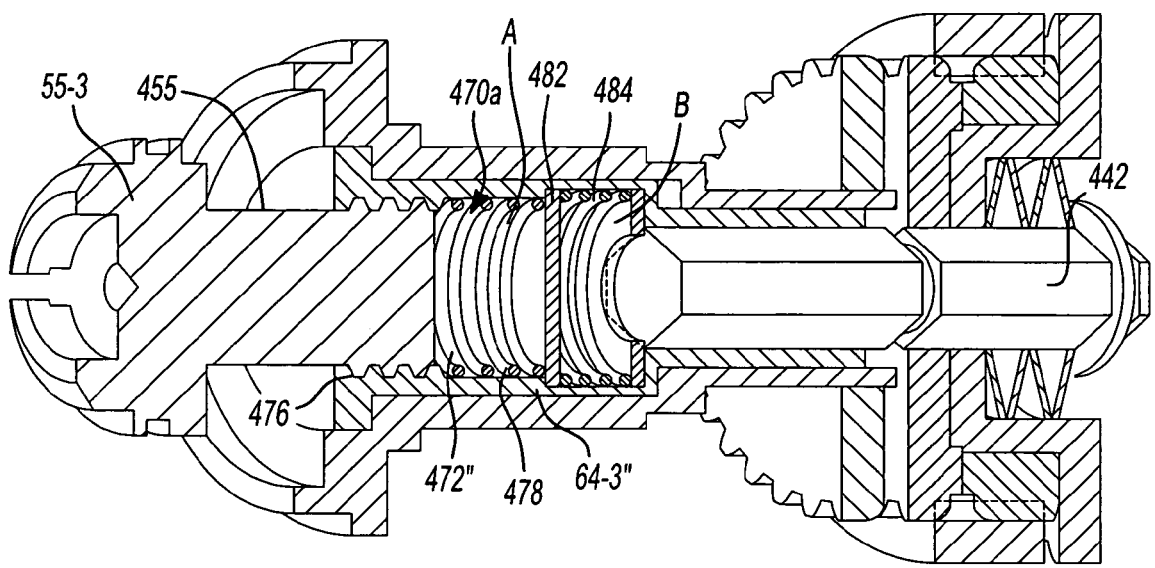

The embodiment of FIG. 12 is generally similar to that of FIG. 10, except that the anti-over tightening mechanism 470a is illustrated to include a separator disk 482 and a second spring 484. The separator disk 482 is disposed between the spring 478 and the second spring 484 in the cavity 472" in the chuck actuating shaft 64-3". It will bee appreciated that the cavity 472" is stepped, having a first portion A and a second portion B that can be different in size and/or shape relative to the first portion A. In the example provided, the second portion B is larger in diameter than the first portion A so that the spring 478 is disposed in the first portion A while the spacer 482 and the second spring 484 are disposed in the second portion B. The second spring 484 can be configured to exert a force onto the PTO actuator shaft 442.

Figure 13:
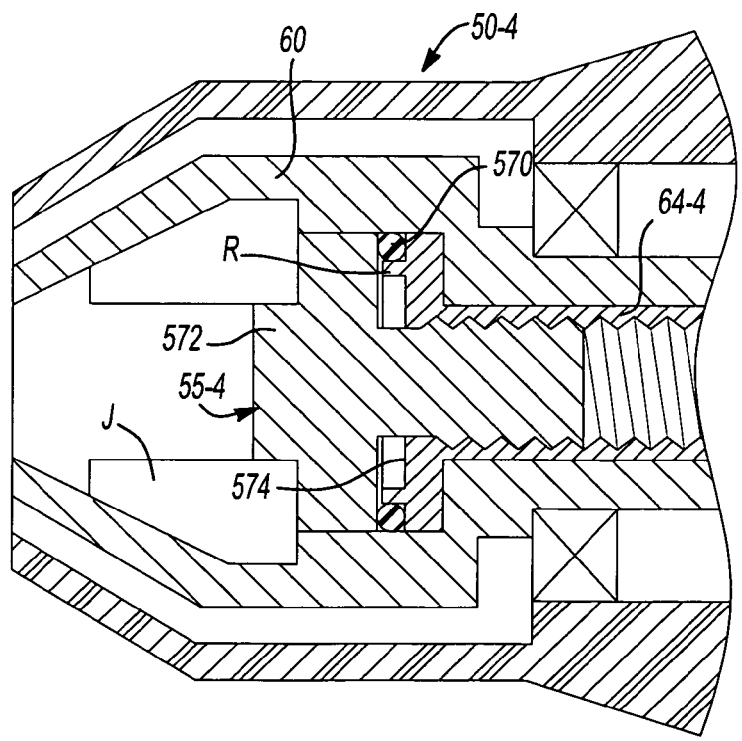
FIG. 13 is a sectional view of a portion of a fifth chuck constructed in accordance with the teachings of the present disclosure.

With reference to FIG. 13 of the drawings, a portion of another PTO-driven chuck 50-4 constructed in accordance with the teachings of the present disclosure is illustrated. The PTO-driven chuck 50-4 is generally similar to the tool chuck 50 described above and illustrated in FIGS. 1 through 5, except that a cushion 570 is employed to resiliently deform when the jaws J are positioned in a position that corresponds to a maximum opening. In the example provided, the cushion 570 is disposed between the chuck actuating screw 55-4 and the chuck actuating shaft 64-4, but it will be appreciated that the cushion may be positioned in any appropriate location. The cushion 570 can comprise a resilient member, such as an elastomer, that can be disposed between the head 572 of the chuck actuating screw 55-4 and the forward face 574 of the chuck actuating shaft 64-4. An annular rim R can extend from the forward face 574 and can be employed to locate the cushion 570 relative to the chuck actuating shaft 644. The cushion 570 can be an O-ring and can, through deformation, decelerate the chuck actuating screw 55-4 as the chuck jaws J are opened to a maximum opening.

Figure 14:
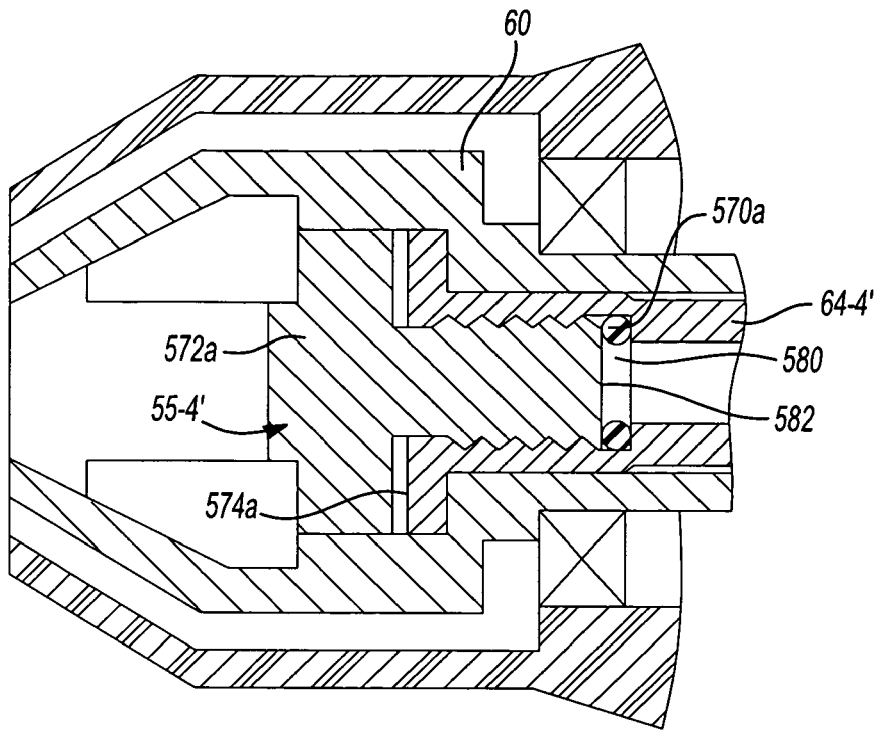
FIGS. 14 through 18 are sectional views similar to that of FIG. 14 but illustrating different cushioning means.
Figure 15:
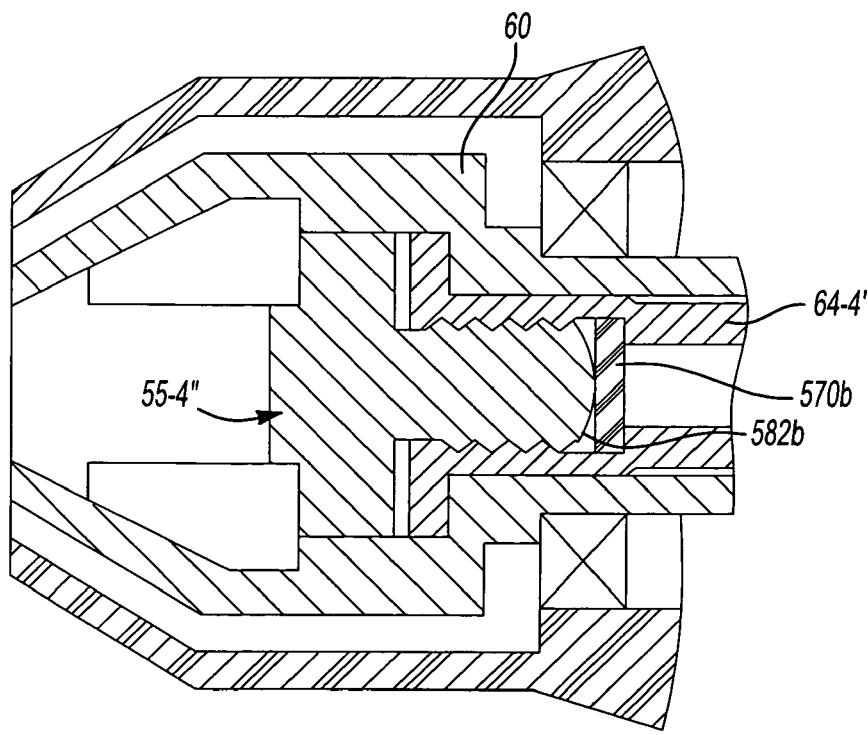

While the cushion 570 has been illustrated as being disposed between the head 572 and the forward face 574, those of ordinary skill in the art will appreciate that the disclosure, in its broadest aspects, can be constructed somewhat differently. For example, the cushion 570*a* can be located within a cavity 580 that is formed in the chuck actuating shaft 64-4' as shown in FIG. 14. In this example, the end 582 of the chuck actuating screw 55-4' is configured to contact the cushion 570*a* when the head 572*a* is spaced apart from the forward face 574*a*. It will be appreciated that while the cushion 570*a* has been illustrated to be an o-ring, various other types of cushions may be employed, such as a solid resilient cushion or plug 570*b*, which is shown in FIG. 15. Those of ordinary skill in the art will also appreciate that the end 582 of the chuck actuating screw 55-4' may be configured in any desired manner. For example, the end 582*b* of the chuck actuating screw 55-4", such as with a spherical radius.

Figure 16:
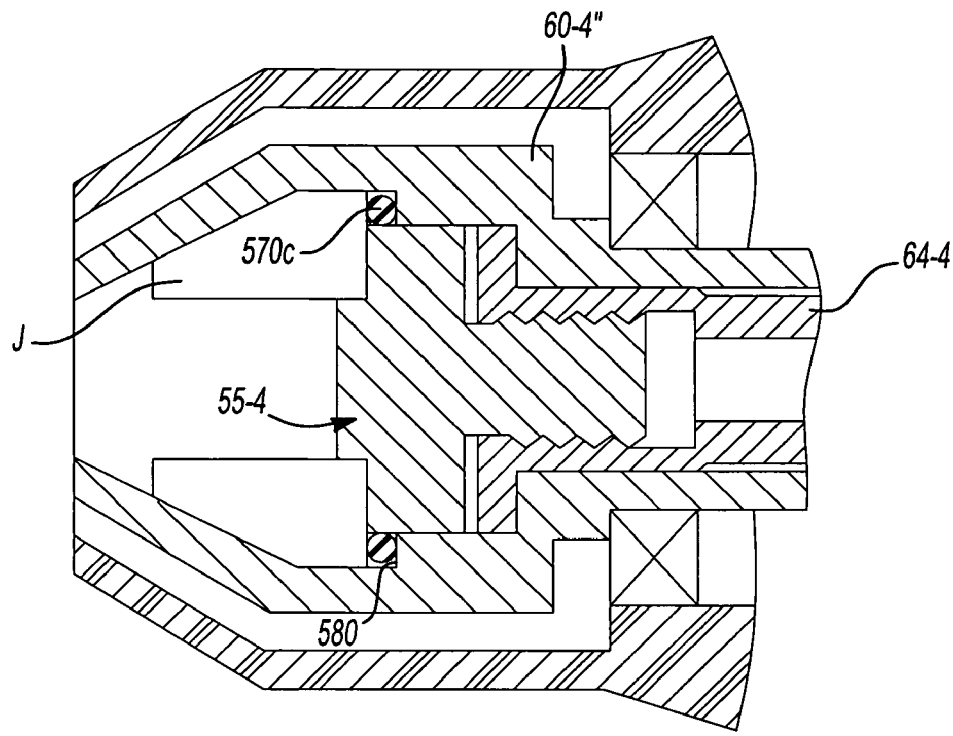

As yet another example, the cushion 570*c* can be coupled to the rearward face of the chuck jaws J as illustrated in FIG. 16. In this example, the cushion 570*c* is an O-ring that is disposed between the chuck jaws J and a forward facing surface 580 that is formed on the input shaft 60-4". Accordingly, the cushion 570*c* can, through deformation, decelerate the jaws J (and thus the chuck actuating screw 55-4) as the chuck jaws J are opened to a maximum opening.

Figure 17:
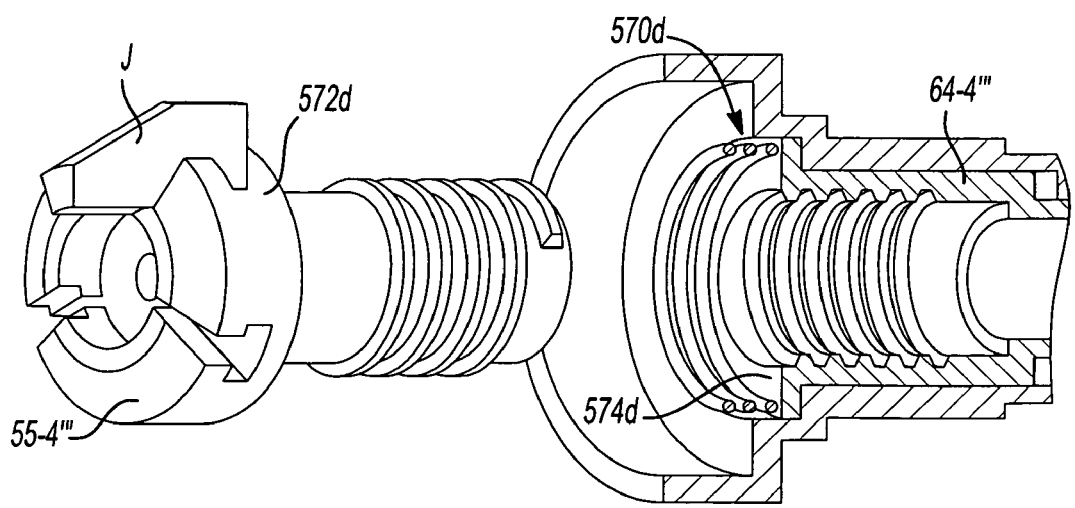
Figure 18:
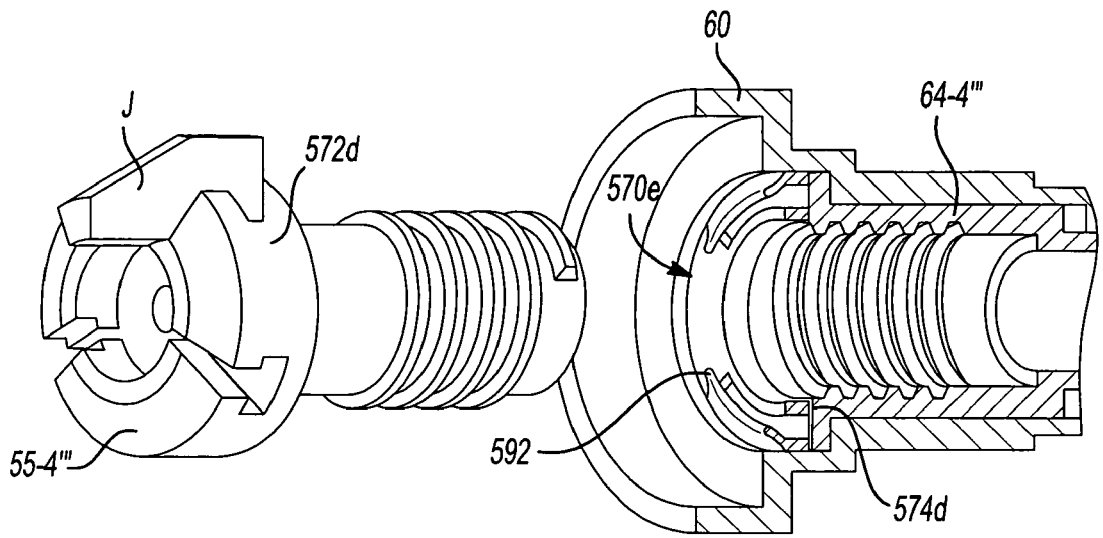

A further example is illustrated in FIG. 17, wherein the cushion 570*d* includes a spring that can be disposed between the forward face 574*d* of the chuck actuating shaft 64-4''' and the head 572*d* of the chuck actuating screw 55-4'''. The spring can be any appropriate type of spring, such as a compression spring, which is illustrated in FIG. 17, a Belleville washer, a wave spring or a spring washer-like structure 570*e* having a plurality of spring tabs 592, which is illustrated in FIG. 18. The spring washer-like structure 570*e* can be disposed between the forward face 574*d* of the chuck actuating shaft 64-4''' and the head 572*d* of the chuck actuating screw 55-4'''. Alternatively, the spring washer-like structure 570*e* can be disposed between the input shaft 60 and the head 572*d* of the chuck actuating screw 55-4''' or between the input shaft 60 and the jaws J.

Figure 19:
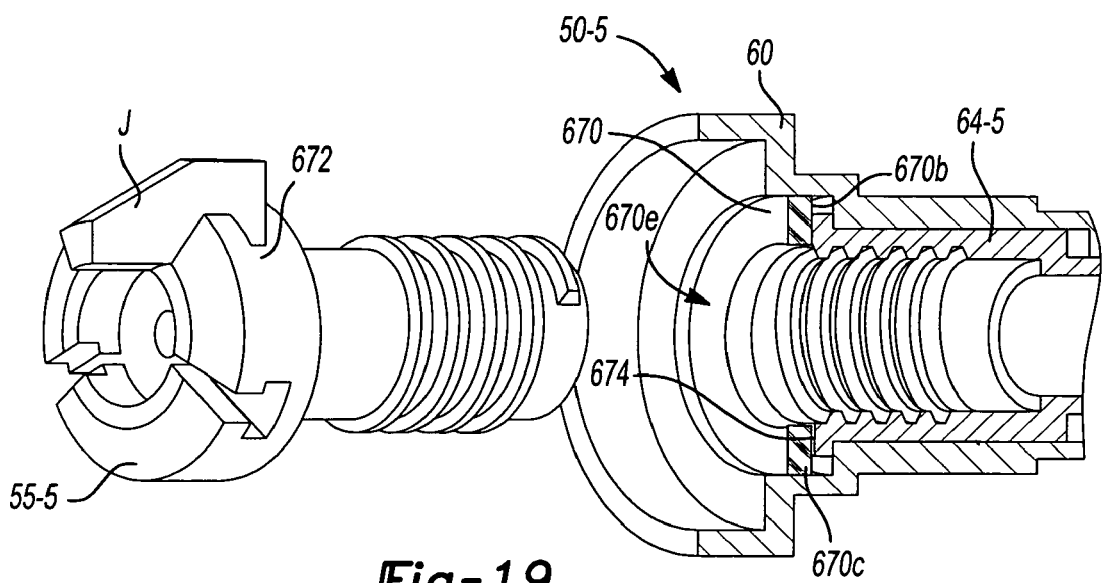
FIG. 19 is a sectional perspective view of a portion of a sixth chuck constructed in accordance with the teachings of the present disclosure.

With reference to FIG. 19 of the drawings, a portion of another PTO-driven chuck 50-5 constructed in accordance with the teachings of the present disclosure is illustrated. The PTO-driven chuck 50-5 is generally similar to the tool chuck 50 described above and illustrated in FIGS. 1 through 5, except for the use of a cushion 670 has been substituted for the thread stop dogs. The cushion 670 can be located between the chuck actuating screw 55-5 and the chuck actuating shaft 64-5. The cushion 670 can be an annular-shaped structure with opposite thrust surfaces 670*a* and 670*b*. The cushion 670 can be constructed with a relatively high damping characteristic and a relatively low spring force characteristic that render the opposite thrust surfaces 670*a* and 670*b* rigid when initially abutted against the head 672 of the chuck actuating screw 55-5 and the forward face 674 of the chuck actuating shaft 64-5. The configuration of the cushion 670, however, is such that the body 670*c* "relaxes" or shrinks under a sustained clamp load (i.e., a load that is exerted by the head 672 of the chuck actuating screw 55-5 when the chuck actuating screw 55-5 is tensioned by the chuck actuating shaft 64-5). The amount of relaxation or shrink can be relatively small, on the order of a few thousandths of an inch or less whereby the thrust surfaces 670*a* and 670*b* are moved closer to one another. As tension in the chuck actuating screw 55-5 is a function of its elongation, and the relaxation or shrinking of the cushion 670 correspondingly reduces elongation of the chuck actuating screw 55-5, the relaxation or shrinking of the cushion 670 effectively reduces or eliminates tension in the chuck actuating screw 55-5. In the particular example provided, the cushion 670 is an annular structure that is formed of a suitable polymer. It will be appreciated that the cushion 670 could be positioned in the alternative between the head 672 of the chuck actuating screw 55-5 and the input shaft 60 or between the jaws J and the input shaft 60.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A chuck for a drill/driver, the chuck comprising:
   an input shaft having a cavity;
   a chuck actuating shaft received in the cavity and rotatable about a chuck axis, the chuck actuating shaft having an aperture with a female threaded portion;
   a chuck actuating screw having a male threaded portion that is threadably engaged to the female threaded portion;
   a plurality of jaws received in the cavity and engaging the input shaft, the jaws being coupled to the chuck actuating screw such that rotation of the chuck actuating shaft relative to the chuck actuating screw translates the jaws so that the jaws converge toward or diverge from the chuck axis; and means coupled to at least one of the chuck actuating screw, the chuck actuating shaft and the input shaft for limiting elongation of the chuck actuating screw in an axial direction when the jaws are positioned in a fully opened condition;

wherein the means for limiting elastic elongation includes a first thread stop dog and a second thread stop dog, wherein contact between the first and second thread stop dogs inhibits rotation of the chuck actuating screw in a predetermined rotational direction, wherein the first thread stop dog is coupled to an annular body that is disposed about the chuck actuating screw, and wherein said annular body is rotatable relative to the chuck actuating screw.

2. The chuck of claim 1, wherein the annular body includes a plurality of engaging features that are engagable with mating engaging features coupled to the chuck actuating shaft, wherein engagement of the engaging features with the mating engaging features rotatably couples the annular body with the chuck actuating shaft.

3. The chuck of claim 2, wherein a spring biases the first thread stop dog away from the second thread stop dog.

4. A chuck for a drill/driver, the chuck comprising:
an input shaft having a cavity;
a chuck actuating shaft received in the cavity and rotatable about a chuck axis, the chuck actuating shaft having an aperture with a female threaded portion;
a chuck actuating screw having a male threaded portion that is threadably engaged to the female threaded portion;
a plurality of jaws received in the cavity and engaging the input shaft, the jaws being coupled to the chuck actuating screw such that rotation of the chuck actuating shaft relative to the chuck actuating screw translates the jaws so that the jaws converge toward or diverge from the chuck axis; and
means coupled to at least one of the chuck actuating screw, the chuck actuating shaft and the input shaft for limiting elongation of the chuck actuating screw in an axial direction when the jaws are positioned in a fully opened condition;
wherein the means for limiting elastic elongation includes a first thread stop dog and a second thread stop dog, wherein contact between the first and second thread stop dogs inhibits rotation of the chuck actuating screw in a predetermined rotational direction;
wherein the first thread stop dog is coupled to an annular body that is disposed about the chuck actuating screw; and
wherein the first thread stop dog is pivotally movable between a retracted position and an extended position.

5. The chuck of claim 4, wherein the chuck actuating screw includes a stop tooth and wherein the second thread stop dog is formed on a first side of the stop tooth and is configured to engage the first thread stop dog when the first thread stop dog is in the extended position.

6. The chuck of claim 5, wherein a ramp is formed on a second side of the stop tooth opposite the first side, the ramp being tapered so as move the first thread stop dog from the extended position to the retracted position in response to contact therebetween.

7. A chuck for a drill/driver, the chuck comprising: an input shaft having a cavity; a chuck actuating shaft received in the cavity and rotatable about a chuck axis, the chuck actuating shaft having an aperture with a female threaded portion; a chuck actuating screw having a male threaded portion that is threadably engaged to the female threaded portion; a plurality of jaws received in the cavity and engaging the input shaft, the jaws being coupled to the chuck actuating screw such that rotation of the chuck actuating shaft relative to the chuck actuating screw translates the jaws so that the jaws converge toward or diverge from the chuck axis; and means coupled to at least one of the chuck actuating screw, the chuck actuating shaft and the input shaft for limiting elongation of the chuck actuating screw in an axial direction when the jaws are positioned in a fully opened condition, wherein the means for limiting elastic elongation includes a resilient element that is disposed between the chuck: actuating screw and the chuck actuating shaft, the resilient element deflecting when the jaws are positioned in the fully opened condition, and wherein at least one of the jaws contact the resilient element when the jaws are positioned in the fully opened condition.

8. The chuck of claim 7, wherein the resilient element is formed of an elastomer.

9. The chuck of claim 8, wherein the resilient element is disposed within the aperture.

10. The chuck of claim 9, wherein a portion of the chuck actuating screw that contacts the resilient element has an end face that is defined at least partially by a spherical radius.

11. The chuck of claim 7, wherein the resilient element is at least one of a Belleville washer, a wave spring, and a compression spring.

12. The chuck of claim 7, wherein the resilient element is disposed between the chuck actuating screw and the input shaft.

13. A chuck for a drill/driver, the chuck comprising:
an input shaft having a cavity;
a chuck actuating shaft received in the cavity and rotatable about a chuck axis, the chuck actuating shaft having an aperture with a female threaded portion;
a chuck actuating screw having a male threaded portion that is threadably engaged to the female threaded portion;
a plurality of jaws received in the cavity and engaging the input shaft, the jaws being coupled to the chuck actuating screw such that rotation of the chuck actuating shaft relative to the chuck actuating screw translates the jaws so that the jaws converge toward or diverge from the chuck axis; and
means coupled to at least one of the chuck actuating screw, the chuck actuating shaft and the input shaft for limiting elongation of the chuck actuating screw in an axial direction when the jaws are positioned in a fully opened condition, wherein the means for limiting elastic elongation includes a polymer cushion that is disposed between the chuck actuating screw and one of the chuck actuating shaft and the input shaft, the polymer cushion having a relatively high damping characteristic and a relatively low spring force and being configured to relax after application of a compressive force.

14. A chuck for a drill/driver, the chuck comprising:
an input shaft having a cavity;
a chuck actuating shaft received in the cavity and rotatable about a chuck axis, the chuck actuating shaft having an aperture with a female threaded portion;
a chuck actuating screw having a male threaded portion that is threadably engaged to the female threaded portion;

a plurality of jaws received in the cavity and engaging the input shaft, the jaws being coupled to the chuck actuating screw such that rotation of the chuck actuating shaft relative to the chuck actuating screw translates the jaws so that the jaws converge toward or diverge from the chuck axis; and means coupled to at least one of the chuck actuating screw, the chuck actuating shaft and the input shaft for limiting elongation of the chuck actuating screw in an axial direction when the jaws are positioned in a fully opened condition, wherein the means for limiting elastic elongation includes an unthreaded neck portion and an unthreaded aperture portion, the unthreaded neck portion being disposed between a head of the chuck actuating screw and the male threaded portion, the unthreaded neck portion being sized to be received in the female threaded portion of the aperture, the unthreaded aperture portion being a portion of the aperture in the chuck actuating shaft and disposed adjacent the threaded aperture, the unthreaded aperture portion being sized to receive the male threaded portion, wherein the male threaded portion is threadably disengaged from the female threaded portion and disposed in the unthreaded aperture portion when the jaws are in the fully open position.

15. The chuck of claim 14, wherein at least one spring is disposed in the aperture in the chuck actuating shaft, the at least one spring biasing the male threaded portion into against the female threaded portion when the jaws are in the fully opened position.

\* \* \* \* \*